US012381864B2

(12) United States Patent
Yamamoto et al.

(10) Patent No.: US 12,381,864 B2
(45) Date of Patent: Aug. 5, 2025

(54) SETTING DEVICE, COMMUNICATION SYSTEM, AND VEHICLE COMMUNICATION MANAGEMENT METHOD

(71) Applicants: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD., Yokkaichi (JP)

(72) Inventors: Yusuke Yamamoto, Osaka (JP); Takeshi Hagihara, Yokkaichi (JP); Darmawan Go, Yokkaichi (JP); Yosuke Shimizu, Yokkaichi (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

( * ) Notice: Subject to any disclaimer, the term of this patent is extended or adjusted under 35 U.S.C. 154(b) by 235 days.

(21) Appl. No.: 17/612,136

(22) PCT Filed: Mar. 10, 2020

(86) PCT No.: PCT/JP2020/010264
§ 371 (c)(1),
(2) Date: Nov. 17, 2021

(87) PCT Pub. No.: WO2020/240984
PCT Pub. Date: Dec. 3, 2020

(65) Prior Publication Data
US 2022/0231997 A1    Jul. 21, 2022

(30) Foreign Application Priority Data

May 30, 2019  (JP) .................................. 2019-101427

(51) Int. Cl.
*H04L 9/40*        (2022.01)
*H04L 67/12*       (2022.01)

(52) U.S. Cl.
CPC .......... *H04L 63/08* (2013.01); *H04L 63/0428* (2013.01); *H04L 67/12* (2013.01)

(58) Field of Classification Search
CPC ..... H04L 63/08; H04L 63/0428; H04L 67/12; H04L 12/28; H04W 4/48; H04W 12/06
(Continued)

(56) References Cited

U.S. PATENT DOCUMENTS

2002/0146002 A1    10/2002  Sato
2007/0185624 A1*    8/2007  Duddles ................. G06F 8/654
                                                     701/1
(Continued)

FOREIGN PATENT DOCUMENTS

CN    102333118 A  *  1/2012
CN    106961437 A     7/2017
(Continued)

OTHER PUBLICATIONS

Mar. 16, 2023 Office Action Issued In U.S. Appl. No. 17/615,174.
(Continued)

*Primary Examiner* — Jacob Lipman
(74) *Attorney, Agent, or Firm* — Oliff PLC

(57) ABSTRACT

A network having a new configuration is flexibly constructed through a simple process while ensuring security in the network. A setting device includes: an acquisition unit configured to acquire an authentication result regarding a new function unit serving as a function unit newly added to an in-vehicle network including one or a plurality of function units; and a setting unit configured to, when the authentication result acquired by the acquisition unit is affirmative, perform a setting process for allowing the new function unit
(Continued)

and an existing function unit serving as a function unit included in the in-vehicle network before the new function unit is added thereto, to perform communication via a plurality of relay devices capable of relaying information between the function units, the setting process being regarding at least one of the relay devices, the existing function unit, and the new function unit.

11 Claims, 11 Drawing Sheets

(58) Field of Classification Search
USPC .............................................................. 726/3
See application file for complete search history.

(56) References Cited

U.S. PATENT DOCUMENTS

| | | |
|---|---|---|
| 2008/0059806 A1 | 3/2008 | Kishida et al. |
| 2010/0002710 A1 | 1/2010 | Isoyama |
| 2010/0302974 A1* | 12/2010 | Niiyama .............. G07C 5/0808 370/254 |
| 2010/0313242 A1 | 12/2010 | Sato |
| 2012/0054835 A1 | 3/2012 | Oda et al. |
| 2012/0277949 A1* | 11/2012 | Ghimire .................. G07C 5/008 701/31.7 |
| 2013/0010640 A1 | 1/2013 | Higuchi et al. |
| 2014/0068099 A1 | 3/2014 | Komori |
| 2014/0280809 A1* | 9/2014 | Li ....................... H04L 41/0806 709/222 |
| 2015/0145648 A1* | 5/2015 | Winkelman ....... G07C 9/00571 340/5.72 |
| 2015/0172298 A1 | 6/2015 | Otsuka |
| 2016/0308822 A1* | 10/2016 | Chae ....................... H04W 4/48 |
| 2016/0315766 A1 | 10/2016 | Ujiie et al. |
| 2016/0373449 A1 | 12/2016 | Haga et al. |
| 2017/0134164 A1 | 5/2017 | Haga et al. |
| 2017/0331767 A1 | 11/2017 | Zinner |
| 2017/0352210 A1* | 12/2017 | Maiwand ........... G07C 9/00571 |
| 2018/0009446 A1 | 1/2018 | Ricci |
| 2018/0077062 A1 | 3/2018 | Park et al. |
| 2018/0367546 A1 | 12/2018 | Miyashita |
| 2019/0044730 A1 | 2/2019 | Woo et al. |
| 2019/0173912 A1 | 6/2019 | Ujiie et al. |
| 2019/0197468 A1 | 6/2019 | Endo et al. |
| 2019/0334897 A1 | 10/2019 | Anzai et al. |
| 2019/0356608 A1 | 11/2019 | Tanaka et al. |
| 2019/0394065 A1 | 12/2019 | Okubo et al. |
| 2020/0029213 A1* | 1/2020 | Nölscher ................. B60R 25/24 |
| 2020/0084025 A1 | 3/2020 | Ujiie et al. |
| 2020/0106704 A1 | 4/2020 | Wata et al. |
| 2020/0137049 A1 | 4/2020 | Ogawa et al. |
| 2020/0220716 A1 | 7/2020 | Haga et al. |
| 2020/0366529 A1 | 11/2020 | Park |
| 2021/0028925 A1 | 1/2021 | Ujiie et al. |
| 2021/0329002 A1 | 10/2021 | Huh et al. |

FOREIGN PATENT DOCUMENTS

| | | |
|---|---|---|
| CN | 108881247 A | 11/2018 |
| JP | 2002-314573 A | 10/2002 |
| JP | 2003-046536 A | 2/2003 |
| JP | 2003-244185 A | 8/2003 |
| JP | 2008-059450 A | 3/2008 |
| JP | 2010-183204 A | 8/2010 |
| JP | 2010-283607 A | 12/2010 |
| JP | 2013-017021 A | 1/2013 |
| JP | 2013-193598 A | 9/2013 |
| JP | 2016-127299 A | 7/2016 |
| JP | 2016-134170 A | 7/2016 |
| JP | 2016-152429 A | 8/2016 |
| JP | 2017-005617 A | 1/2017 |
| JP | 2017-059210 A | 3/2017 |
| JP | 2017-212728 A | 11/2017 |
| JP | 2017-220220 A | 12/2017 |
| JP | 2018-117254 A | 7/2018 |
| JP | 2018113505 A | 7/2018 |
| JP | 2018-152758 A | 9/2018 |
| JP | 2018-174481 A | 11/2018 |
| JP | 2018-192876 A | 12/2018 |
| JP | 2019-016247 A | 1/2019 |
| WO | 2013/161873 A1 | 10/2013 |
| WO | 2016/075865 A1 | 5/2016 |
| WO | 2016/075869 A1 | 5/2016 |
| WO | 2016/204081 A1 | 12/2016 |

OTHER PUBLICATIONS

Jun. 28, 2023 Office Action issued in U.S. Appl. No. 17/622,892.
U.S. Appl. No. 17/615,174, filed Nov. 30, 2021 in the name of Yusuke Yamamoto et al.
U.S. Appl. No. 17/624,784, filed Jan. 4, 2022 in the name of Yojiro Suyama et al.
U.S. Appl. No. 17/622,892, filed Dec. 27, 2021 in the name of Yojiro Suyama et al.
Sep. 7, 2023 U.S. Office Action issued U.S. Appl. No. 17/615,174.
Feb. 15, 2023 Office Action issued in U.S. Appl. No. 17/622,892.
Oct. 20, 2023 Notice of Allowance issued in U.S. Appl. No. 17/622,892.
Jan. 24, 2024 Office Action issued in U.S. Appl. No. 17/624,784.
Apr. 10, 2024 Office Action issued in U.S. Appl. No. 17/615,174.
Apr. 26, 2024 Notice of Allowance issued in U.S. Appl. No. 17/622,892.
May 15, 2024 Notice of Allowance issued in U.S. Appl. No. 17/624,784.
Specification of U.S. Appl. No. 18/781,541, filed Jul. 23, 2024 in the name of Yojiro Suyama et al.
Aug. 30, 2024 Office Action issued in U.S. Appl. No. 18/403,973.
Dec. 9, 2024 Notice of Allowance issued in U.S. Appl. No. 18/403,973.
Oct. 23, 2024 Office Action issued in U.S. Appl. No. 17/615,174.
Oct. 28, 2024 Notice of Allowance issued in U.S. Appl. No. 17/624,784.
Jan. 10, 2025 Office Action issued in U.S. Appl. No. 17/615,174.
Feb. 4, 2025 Notice of Allowance issued in U.S. Appl. No. 17/624,784.
Feb. 26, 2025 Notice of Allowance issued in U.S. Appl. No. 17/615,174.
May 15, 2025 Notice of Allowance issued in U.S. Appl. No. 18/403,973.
May 21, 2025 Notice of Allowance issued in U.S. Appl. No. 17/624,784.
U.S. Appl. No. 19/214,569, filed May 21, 2025 in the name of Yamamoto.

* cited by examiner

FIG. 2

| DEVICE | PORT NUMBER | VLAN ID |
|---|---|---|
| RELAY DEVICE 100A | 1A | - |
| | 2A | VLAN10 |
| | 3A | VLAN20 |
| | 4A | VLAN10 VLAN20 |
| RELAY DEVICE 100B | 1B | VLAN10 VLAN20 |
| | 2B | VLAN10 |
| | 3B | VLAN20 |
| | 4B | - |
| IN-VEHICLE ECU 111A | 1 | VLAN10 |
| IN-VEHICLE ECU 111B | 1 | VLAN20 |
| IN-VEHICLE ECU 111C | 1 | VLAN10 |
| IN-VEHICLE ECU 111D | 1 | VLAN20 |

FIG. 6

| DEVICE | PORT NUMBER | VLAN ID |
|---|---|---|
| RELAY DEVICE 1 | 1A | VLAN30 |
| | 2A | VLAN10 |
| | 3A | VLAN20 |
| | 4A | VLAN10<br>VLAN20<br>VLAN30 |
| RELAY DEVICE 2 | 1B | VLAN10<br>VLAN20<br>VLAN30 |
| | 2B | VLAN10<br>VLAN30 |
| | 3B | VLAN20 |
| | 4B | - |
| IN-VEHICLE ECU 111A | 1 | VLAN10 |
| IN-VEHICLE ECU 111B | 1 | VLAN20 |
| IN-VEHICLE ECU 111C | 1 | VLAN10<br>VLAN30 |
| IN-VEHICLE ECU 111D | 1 | VLAN20 |
| IN-VEHICLE ECU 111E | 1 | VLAN30 |

FIG. 8

| DEVICE | PORT NUMBER | VLAN ID |
|---|---|---|
| RELAY DEVICE 100A | 1A | VLAN10 |
| | 2A | VLAN10 |
| | 3A | VLAN20 |
| | 4A | VLAN10<br>VLAN20 |
| RELAY DEVICE 100B | 1B | VLAN10<br>VLAN20 |
| | 2B | VLAN10 |
| | 3B | VLAN20 |
| | 4B | - |
| IN-VEHICLE ECU 111A | 1 | VLAN10 |
| IN-VEHICLE ECU 111B | 1 | VLAN20 |
| IN-VEHICLE ECU 111C | 1 | VLAN10 |
| IN-VEHICLE ECU 111D | 1 | VLAN20 |
| IN-VEHICLE ECU 111E | 1 | VLAN10 |

SETTING DEVICE, COMMUNICATION SYSTEM, AND VEHICLE COMMUNICATION MANAGEMENT METHOD

TECHNICAL FIELD

The present disclosure relates to a setting device, a communication system, and a vehicle communication management method.

This application claims priority on Japanese Patent Application No. 2019-101427 filed on May 30, 2019, the entire content of which is incorporated herein by reference.

BACKGROUND ART

PATENT LITERATURE 1 (Japanese Laid-Open Patent Publication No. 2008-59450) discloses a vehicle information rewriting system as below. That is, disclosed is a vehicle information rewriting system in which: a rewriting tool functioning as a data sender is removably connected through communication means to a vehicle control unit that has a main controller implemented as a CPU and that performs, on the basis of execution of predetermined software by the main controller, a control process of electronic devices installed in a vehicle; and a memory content of a vehicle information storage that is provided as a nonvolatile memory on the vehicle control unit side and that stores vehicle information including the software is rewritten on the basis of rewriting data transferred through the communication means from the rewriting tool. In the vehicle information rewriting system, the rewriting tool is provided with: operation mode switching means that sets switching between a rewriting permitted mode in which a rewriting operation of the memory content of the vehicle information storage is permitted and a rewriting restricted mode in which the rewriting operation is restricted relative to the rewriting permitted mode; wireless polling means that, during rewriting operation with use of the rewriting tool, and in order to detect a wireless authentication medium that should be carried by an authorized user of the rewriting tool, wirelessly polls the wireless authentication medium; and mode switch ordering means that orders the operation mode switching means to switch to the rewriting permitted mode on a precondition of a success of detection of the wireless authentication medium through the wireless polling.

PATENT LITERATURE 2 (Japanese Laid-Open Patent Publication No. 2003-46536) discloses a vehicular relay device as below. That is, provided is a vehicular relay device disposed between an in-vehicle LAN constructed in a vehicle and a communication device that performs data communication with an external device located outside of the vehicle, the vehicular relay device being configured to relay communication between the external device connected through the communication device and various in-vehicle electronic devices connected to the in-vehicle LAN. The vehicular relay device includes: first identification means that identifies, upon reception of an access request for requesting access to an in-vehicle electronic device in the in-vehicle LAN from the external device, an access destination in-vehicle electronic device, and that determines, on the basis of a result of the identification, whether or not the access request is an access request, for requesting access to the in-vehicle electronic device, that requires authentication of the external device; first authentication means that determines, when the first identification means has determined that the access request requires authentication of the external device, whether or not the external device is an external device for which access to the in-vehicle electronic device has been permitted in advance, on the basis of first authentication information transmitted from the external device; and first delivery means that delivers, to the access destination in-vehicle electronic device, communication data transmitted through the communication device from the external device, when the first authentication means has determined that the external device that has sent the access request is an external device for which access to the in-vehicle electronic device has been permitted in advance, or when the first identification means has determined that the access request does not require authentication of the external device.

CITATION LIST

Patent Literature

PATENT LITERATURE 1: Japanese Laid-Open Patent Publication No. 2008-59450
PATENT LITERATURE 2: Japanese Laid-Open Patent Publication No. 2003-46536

SUMMARY OF INVENTION

A setting device of the present disclosure includes: an acquisition unit configured to acquire an authentication result regarding a new function unit serving as a function unit newly added to an in-vehicle network including one or a plurality of function units; and a setting unit capable of, when the authentication result acquired by the acquisition unit is affirmative, performing a setting process for allowing the new function unit and an existing function unit serving as a function unit included in the in-vehicle network before the new function unit is added thereto, to perform communication via a plurality of relay devices capable of relaying information between the function units, the setting process being regarding at least one of the relay devices, the existing function unit, and the new function unit.

A communication system of the present disclosure includes: a setting device; and a new function unit serving as a function unit newly added to an in-vehicle network including one or a plurality of function units. The setting device acquires information transmitted from the new function unit and capable of specifying a function unit serving as a communication target of the new function unit. The setting device acquires an authentication result regarding the new function unit. When the acquired authentication result is affirmative, the setting device transmits, to the new function unit, setting information for allowing the new function unit and an existing function unit serving as a function unit included in the in-vehicle network before the new function unit is added thereto, to perform communication via a plurality of relay devices capable of relaying information between the function units. The new function unit performs setting for the new function unit on the basis of the setting information received from the setting device.

A vehicle communication management method according to the present disclosure is a vehicle communication management method to be performed in a setting device. The vehicle communication management method includes the steps of: acquiring an authentication result regarding a new function unit serving as a function unit newly added to an in-vehicle network including one or a plurality of function units; and performing, when the acquired authentication result is affirmative, a setting process for allowing the new function unit and an existing function unit serving as a function unit included in the in-vehicle network before the new function unit is added thereto, to perform communication via a plurality of relay devices capable of relaying information between the function units, the setting process being regarding at least one of the relay devices, the existing function unit, and the new function unit.

A vehicle communication management method of the present disclosure is a vehicle communication management method to be performed in a communication system that includes a setting device and a new function unit serving as a function unit newly added to an in-vehicle network including one or a plurality of function units. The vehicle communication management method includes the steps of: acquiring, performed by the setting device, information transmitted from the new function unit and capable of specifying a function unit serving as a communication target of the new function unit; acquiring, performed by the setting device, an authentication result regarding the new function unit; transmitting to the new function unit, performed by the setting device, when the acquired authentication result is affirmative, setting information for allowing the new function unit and an existing function unit serving as a function unit included in the in-vehicle network before the new function unit is added thereto, to perform communication via a plurality of relay devices capable of relaying information between the function units; and performing setting for the new function unit, performed by the new function unit, on the basis of the setting information received from the setting device.

One mode of the present disclosure can be realized as a semiconductor integrated circuit that realizes a part or the entirety of the setting device. One mode of the present disclosure can be realized as a program for causing a computer to execute the steps of the processes in the setting device.

One mode of the present disclosure can be realized as a semiconductor integrated circuit that realizes a part or the entirety of the communication system. One mode of the present disclosure can be realized as a program for causing a computer to execute the steps of the processes in the communication system.

BRIEF DESCRIPTION OF DRAWINGS

FIG. 2 shows setting information in an in-vehicle network according to the embodiment of the present disclosure.

FIG. 6 shows an example of setting information of the new network according to the embodiment of the present disclosure.

FIG. 8 shows another example of setting information of the new network according to the embodiment of the present disclosure.

DESCRIPTION OF EMBODIMENTS

Figure 1:
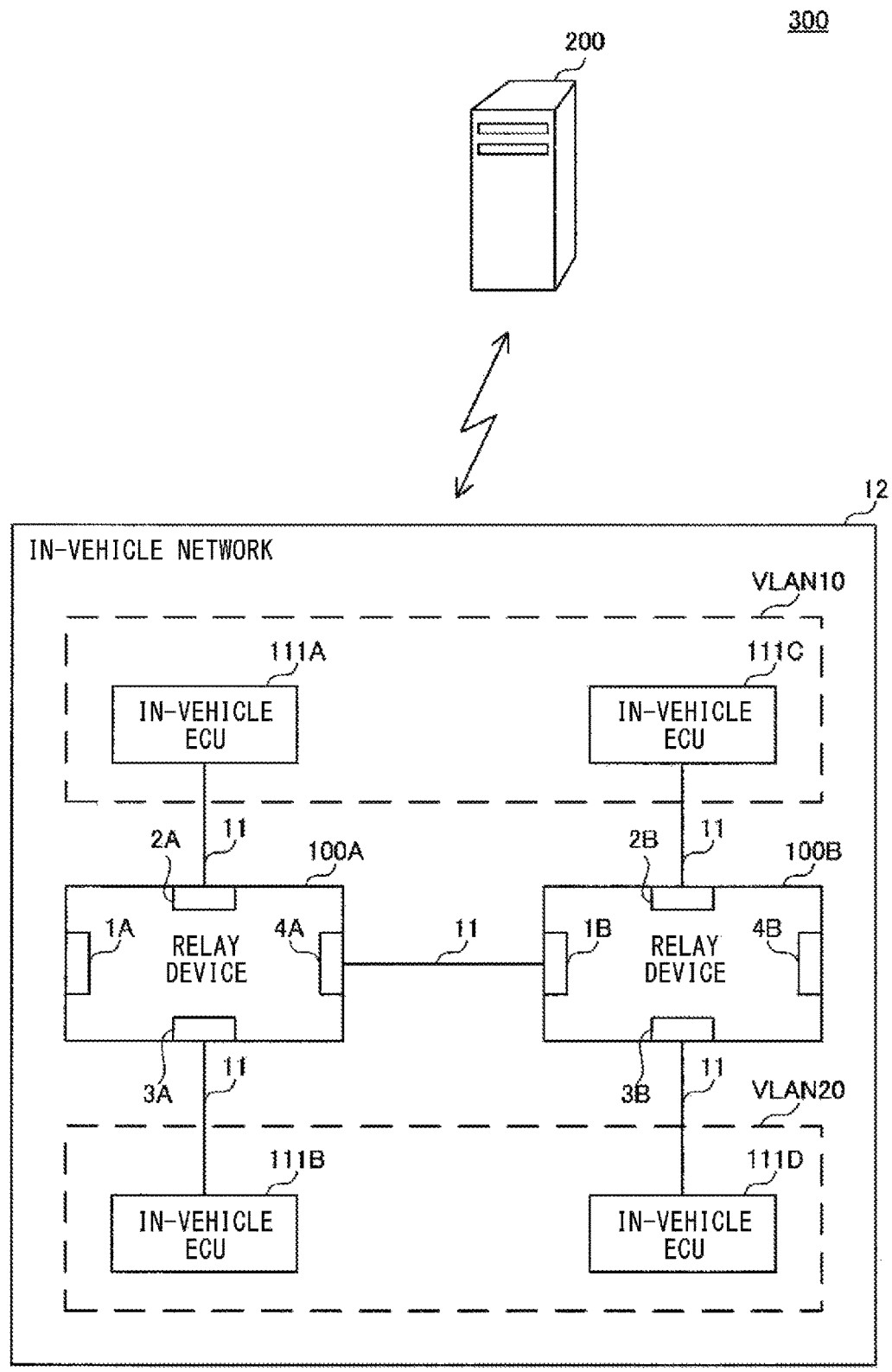
FIG. 1 shows a configuration of a communication system according to an embodiment of the present disclosure.

To date, in-vehicle network systems for improving security in in-vehicle networks have been developed.

Problems to be Solved by the Present Disclosure

A technology that exceeds the technologies described in PATENT LITERATURE 1 and 2 and that can flexibly construct a network having a new configuration through a simple process while ensuring security in the network is desired.

The present disclosure has been made in order to solve the above problem. An object of the present disclosure is to provide a setting device, a communication system, and a vehicle communication management method that can flexibly construct a network having a new configuration through a simple process while ensuring security in the network.

Effects of the Present Disclosure

According to the present disclosure, a network having a new configuration can be flexibly constructed through a simple process while ensuring security in the network.

DESCRIPTION OF EMBODIMENT OF THE PRESENT DISCLOSURE

First, the contents of an embodiment of the present disclosure are listed and described.

(1) A setting device according to an embodiment of the present disclosure includes: an acquisition unit configured to acquire an authentication result regarding a new function unit serving as a function unit newly added to an in-vehicle network including one or a plurality of function units; and a setting unit capable of, when the authentication result acquired by the acquisition unit is affirmative, performing a setting process for allowing the new function unit and an existing function unit serving as a function unit included in the in-vehicle network before the new function unit is added thereto, to perform communication via a plurality of relay devices capable of relaying information between the function units, the setting process being regarding at least one of the relay devices, the existing function unit, and the new function unit.

As described above, when the authentication result regarding the new function unit is affirmative, the setting device performs the setting process for allowing the existing function unit and the new function unit to perform communication via the plurality of relay devices, the setting process being regarding at least one of the relay devices, the existing function unit, and the new function unit. Due to this configuration, for example, when a network for allowing the existing function unit and the new function unit to perform communication via the plurality of relay devices is to be constructed, the authentication process and the like regarding the new function unit by the relay device, which is a part of devices in the in-vehicle network, can be omitted. Therefore, a network having a new configuration can be flexibly constructed through a simple process while ensuring security in the network.

(2) Preferably, the setting device further includes a storage unit configured to store setting information for allowing each function unit in the in-vehicle network to perform communication, and the setting unit performs the setting process on the basis of the setting information in the storage unit.

Due to this configuration, when a new in-vehicle network including a new function unit is to be constructed while the storage unit retains the setting information of the in-vehicle network whose network configuration is basically fixed, setting information of the new in-vehicle network is generated by using the setting information of the existing in-vehicle network acquired from the storage unit. Therefore, the construction process of the new in-vehicle network can be simplified.

(3) Preferably, the setting unit performs the setting process by using a virtual network for transmitting, to each function unit in the in-vehicle network, setting information for allowing each function unit to perform communication.

Due to this configuration, the setting information can be transmitted to each function unit in the in-vehicle network from the setting device by using the virtual network. Therefore, the setting process regarding each function unit can be simplified.

(4) Preferably, the setting unit performs, as the setting process, a process of constructing a new virtual network for allowing the new function unit and one or a plurality of the existing function units serving as a communication target of the new function unit to perform communication.

Due to this configuration, it is possible to suppress adverse influence, such as an unauthorized access, that is associated with addition of a new function unit to the in-vehicle network, on an existing function unit that is not the communication target of the new function unit.

(5) Preferably, when an existing virtual network as a virtual network for allowing one or a plurality of the existing function units serving as a communication target of the new function unit only, to perform communication has been constructed, the setting unit performs, as the setting process, a setting process regarding the new function unit and the relay device and for allowing the new function unit and the one or the plurality of the existing function units serving as the communication target to perform communication by using the existing virtual network.

Due to this configuration, since the setting process regarding the addition of the new function unit to the existing virtual network is performed, the construction process of a new network for allowing only the new function unit and the existing function unit serving as the communication target to perform communication is not necessary.

(6) A communication system according to the embodiment the present disclosure includes: a setting device; and a new function unit serving as a function unit newly added to an in-vehicle network including one or a plurality of function units. The setting device acquires information transmitted from the new function unit and capable of specifying a function unit serving as a communication target of the new function unit. The setting device acquires an authentication result regarding the new function unit. When the acquired authentication result is affirmative, the setting device transmits, to the new function unit, setting information for allowing the function unit serving as the communication target and the new function unit to perform communication via a plurality of relay devices capable of relaying information between the function units. The new function unit performs setting for the new function unit on the basis of the setting information received from the setting device.

As described above, when the authentication result regarding the new function unit is affirmative, the setting device transmits, to the new function unit, setting information for allowing the existing function unit serving as the communication target and the new function unit to perform communication via the plurality of relay devices. Due to this configuration, for example, when a network for allowing the existing function unit and the new function unit to perform communication via the plurality of relay devices is to be constructed, the authentication process and the like regarding the new function unit by the relay device, which is a part of devices in the in-vehicle network, can be omitted. Therefore, a network having a new configuration can be flexibly constructed through a simple process while ensuring security in the network.

(7) A vehicle communication management method according to the embodiment of the present disclosure is performed in a setting device. The vehicle communication management method includes the steps of: acquiring an authentication result regarding a new function unit serving as a function unit newly added to an in-vehicle network including one or a plurality of function units; and performing, when the acquired authentication result is affirmative, a setting process for allowing the new function unit and an existing function unit serving as a function unit included in the in-vehicle network before the new function unit is added thereto, to perform communication via a plurality of relay devices capable of relaying information between the function units, the setting process being regarding at least one of the relay devices, the existing function unit, and the new function unit.

As described above, when the authentication result regarding the new function unit is affirmative, the setting device performs the setting process for allowing the existing function unit and the new function unit to perform communication via the plurality of relay devices, the setting process being regarding at least one of the relay devices, the existing function unit, and the new function unit. Due to this method, for example, when a network for allowing the existing function unit and the new function unit to perform communication via the plurality of relay devices is to be constructed, the authentication process and the like regarding the new function unit by the relay device, which is a part of devices in the in-vehicle network, can be omitted. Therefore, a network having a new configuration can be flexibly constructed through a simple process while ensuring security in the network.

(8) A vehicle communication management method according to the embodiment of the present disclosure is performed in a communication system that includes a setting device and a new function unit serving as a function unit newly added to an in-vehicle network including one or a plurality of function units. The vehicle communication management method includes the steps of: acquiring, performed by the setting device, information transmitted from the new function unit and capable of specifying a function unit serving as a communication target of the new function unit; acquiring, performed by the setting device, an authentication result regarding the new function unit; transmitting to the new function unit, performed by the setting device, when the acquired authentication result is affirmative, setting information for allowing the function unit serving as the communication target and the new function unit to perform communication via a plurality of relay devices capable of relaying information between the function units; and performing setting for the new function unit, performed by the new function unit, on the basis of the setting information received from the setting device.

As described above, when the authentication result regarding the new function unit is affirmative, the setting device transmits, to the new function unit, setting information for allowing the existing function unit serving as the communication target and the new function unit to perform communication via the plurality of relay devices. Due to this method, for example, when a network for allowing the existing function unit and the new function unit to perform communication via the plurality of relay devices is to be constructed, the authentication process and the like regarding the new function unit by the relay device, which is a part of devices of the in-vehicle network, can be omitted. Therefore, a network having a new configuration can be flexibly constructed through a simple process while ensuring security in the network.

Hereinafter, an embodiment of the present disclosure will be described with reference to the drawings. In the drawings, the same or corresponding parts are denoted by the same reference signs, and description thereof is not repeated. At least some of embodiments described below may be combined as desired.

[Communication System]

FIG. 1 shows a configuration of a communication system according to an embodiment of the present disclosure.

With reference to FIG. 1, a communication system 300 includes: one or a plurality of in-vehicle ECUs (Electronic Control Units) 111; a plurality of relay devices 100; and a server 200.

More specifically, the communication system 300 includes in-vehicle ECUs 111A to 111D as the in-vehicle ECUs 111; and a relay device 100A and a relay device 100B as the relay devices 100. The relay device 100A is an example of a setting device.

Each in-vehicle ECU 111 is, for example, a TCU (Telematics Communication Unit), an automated driving ECU, an engine ECU, a sensor, a navigation device, a human machine interface, a camera, or the like. The TCU performs communication with a device outside the vehicle, e.g., the server 200, via a wireless base station or the like (not shown).

Each relay device 100 is a gateway device, for example, and can relay information between a plurality of in-vehicle ECUs 111 connected to the relay device 100. More specifically, the relay device 100 can perform a relay process according to a layer 2, and a layer 3, which is of a higher order than the layer 2, for example.

Each in-vehicle ECU 111 is an example of a function unit in an in-vehicle network 12. The in-vehicle ECUs 111 and the relay devices 100 form the in-vehicle network 12.

The configuration of the communication system 300 is not limited to a configuration that includes four in-vehicle ECUs 111, but may be a configuration that includes one, two, three, five, or more in-vehicle ECUs 111. The configuration of the communication system 300 is not limited to a configuration that includes two relay devices 100, and may be a configuration that includes three or more relay devices 100.

The connection relationship between the function units in the in-vehicle network 12 of the vehicle is fixed, for example.

In the in-vehicle network 12, the in-vehicle ECU 111 is connected to the relay device 100 via an Ethernet (registered trademark) cable 11, for example.

More specifically, the relay device 100A includes communication ports 1A, 2A, 3A, 4A. The relay device 100B includes communication ports 1B, 2B, 3B, 4B. The communication ports 1A, 2A, 3A, 4A, 1B, 2B, 3B, 4B are each a terminal to which an Ethernet cable 11 can be connected, for example.

The in-vehicle ECU 111A is connected via an Ethernet cable 11 to the communication port 2A in the relay device 100A.

The in-vehicle ECU 111B is connected via an Ethernet cable 11 to the communication port 3A in the relay device 100A.

The in-vehicle ECU 111C is connected via an Ethernet cable 11 to the communication port 2B in the relay device 100B.

The in-vehicle ECU 111D is connected via an Ethernet cable 11 to the communication port 3B in the relay device 100B.

The communication port 4A in the relay device 100A and the communication port 1B in the relay device 100B are connected to each other via an Ethernet cable 11.

The relay device 100 performs a relay process of an Ethernet frame in accordance with an Ethernet communication standard. Specifically, the relay device 100 relays an Ethernet frame that is communicated between in-vehicle ECUs 111, for example. An IP packet is stored in the Ethernet frame.

The configuration of the communication system 300 is not limited to a configuration in which relay of the Ethernet frame is performed in accordance with the Ethernet communication standard, and may be a configuration in which relay of data is performed in accordance with a communication standard such as CAN (Controller Area Network) (registered trademark), FlexRay (registered trademark), MOST (Media Oriented Systems Transport) (registered trademark), or LIN (Local Interconnect Network), for example.

In the in-vehicle network 12, one or a plurality of virtual networks are constructed. Specifically, the in-vehicle ECU 111A and the in-vehicle ECU 111C belong to a VLAN (Virtual Local Area Network) 10, and the in-vehicle ECU 111B and the in-vehicle ECU 111D belong to a VLAN 20 different from the VLAN 10.

FIG. 2 shows setting information of the in-vehicle network according to the embodiment of the present disclosure.

In the following, for convenience, the port numbers of the communication ports 1A, 2A, 3A, 4A of the relay device 100A are defined as "1", "2", "3", "4", respectively, and the port numbers of the communication ports 1B, 2B, 3B, 4B of the relay device 100B are defined as "1", "2", "3", "4", respectively. Each in-vehicle ECU 111 includes one communication port, and the port number of the communication port is defined as "1".

With reference to FIG. 2, the ID of the VLAN corresponding to the communication port 2A of the relay device 100A is "VLAN 10", the ID of the VLAN corresponding to the communication port 3A of the relay device 100A is "VLAN 20", and the ID of the VLAN corresponding to the communication port 4A of the relay device 100A is "VLAN 10" and "VLAN 20".

The ID of the VLAN corresponding to the communication port 1B of the relay device 100B is "VLAN 10" and "VLAN 20", the ID of the VLAN corresponding to the communication port 2B of the relay device 100B is "VLAN 10", and the ID of the VLAN corresponding to the communication port 3B of the relay device 100B is "VLAN" 20.

The ID of the VLAN corresponding to the communication port 1 of each of the in-vehicle ECUs 111A, 111C is "VLAN 10", and the ID of the VLAN corresponding to the communication port 1 of each of the in-vehicle ECUs 111B, 111D is "VLAN 20".

Each relay device 100 performs a relay process of an Ethernet frame between in-vehicle ECUs 111 that belong to the same VLAN, for example. Specifically, on the basis of the transmission source MAC (Media Access Control) address and the transmission destination MAC address included in a received Ethernet frame, the relay device 100 transmits the Ethernet frame to a transmission destination in-vehicle ECU 111 that belongs to the same VLAN as that of the transmission source.

In addition, the relay device 100 performs a relay process of an IP packet between in-vehicle ECUs 111 that belong to different VLANs, for example. Specifically, the relay device 100 acquires an IP packet from a received Ethernet frame, and on the basis of the transmission destination IP address of the acquired IP packet, the relay device 100 transmits the IP packet to a transmission destination in-vehicle ECU 111 that belongs to a VLAN different from that of the transmission source.

[Relay Device]

Figure 3:
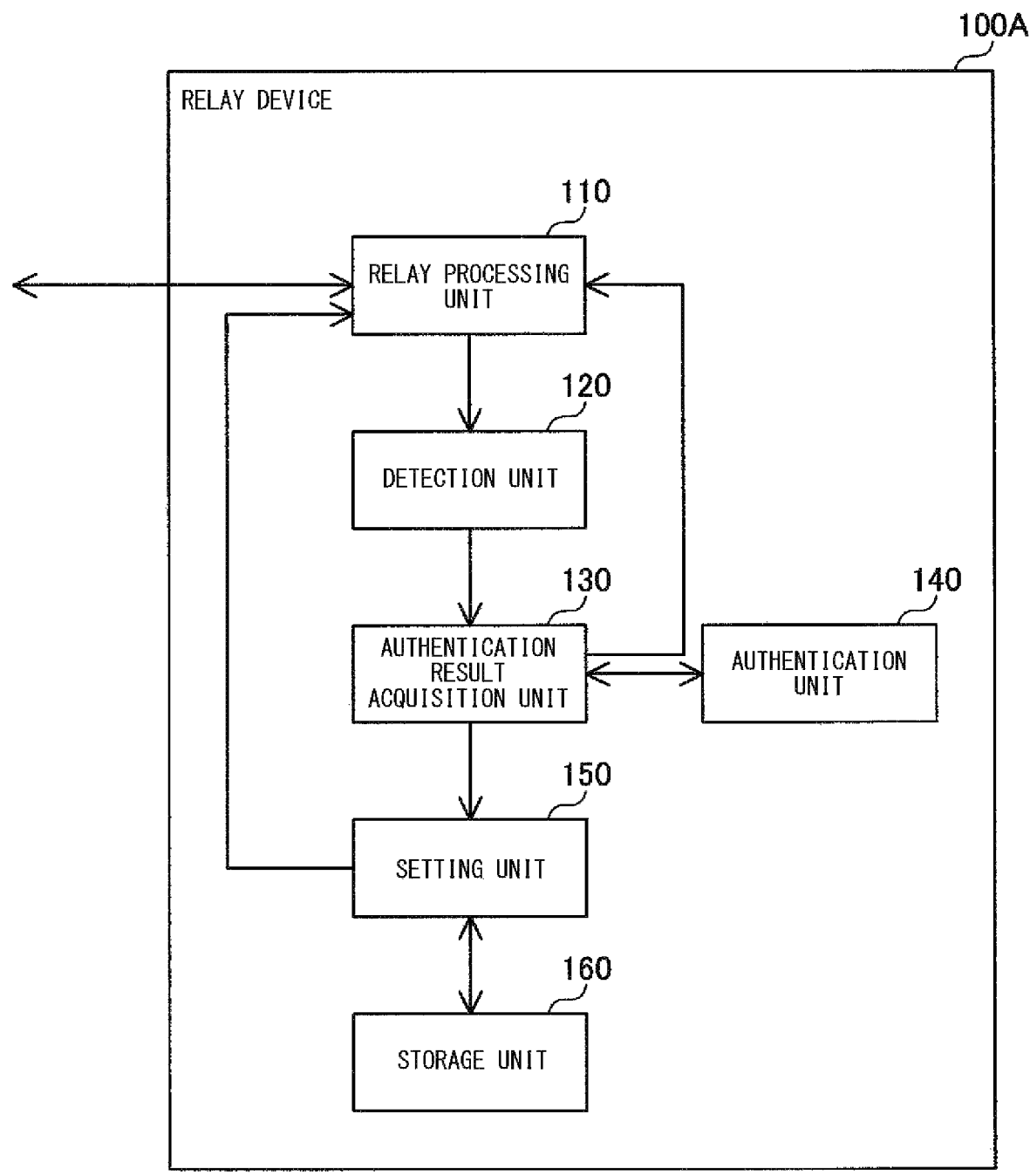
FIG. 3 shows a configuration of a relay device according to the embodiment of the present disclosure.

FIG. 3 shows a configuration of the relay device according to the embodiment of the present disclosure. FIG. 3 shows a configuration of the relay device 100A shown in FIG. 1.

With reference to FIG. 3, the relay device 100A includes a relay processing unit 110, a detection unit 120, an authentication result acquisition unit 130, an authentication unit 140, a setting unit 150, and a storage unit 160. The storage unit 160 is a flash memory, for example. The relay processing unit 110, the detection unit 120, the authentication result acquisition unit 130, the authentication unit 140, and the setting unit 150 are each realized by a processor such as a CPU (Central Processing Unit) or a DSP (Digital Signal Processor), for example.

The relay processing unit 110 performs a relay process of an Ethernet frame between in-vehicle ECUs 111.

More specifically, when the relay processing unit 110 has received an Ethernet frame from an in-vehicle ECU 111 or the relay device 100B via a corresponding Ethernet cable 11, the relay processing unit 110 transmits the received Ethernet frame to the transmission destination in-vehicle ECU 111 or the relay device 100B via a corresponding Ethernet cable 11.

In addition, when the relay processing unit 110 has received, from a new function unit newly added to the in-vehicle network 12, an Ethernet frame addressed to the relay device 100 to which the relay processing unit 110 belongs, the relay processing unit 110 outputs the received Ethernet frame to the detection unit 120.

[Detection Unit]

The detection unit 120 detects a new function unit newly added to the in-vehicle network 12.

Figure 4:
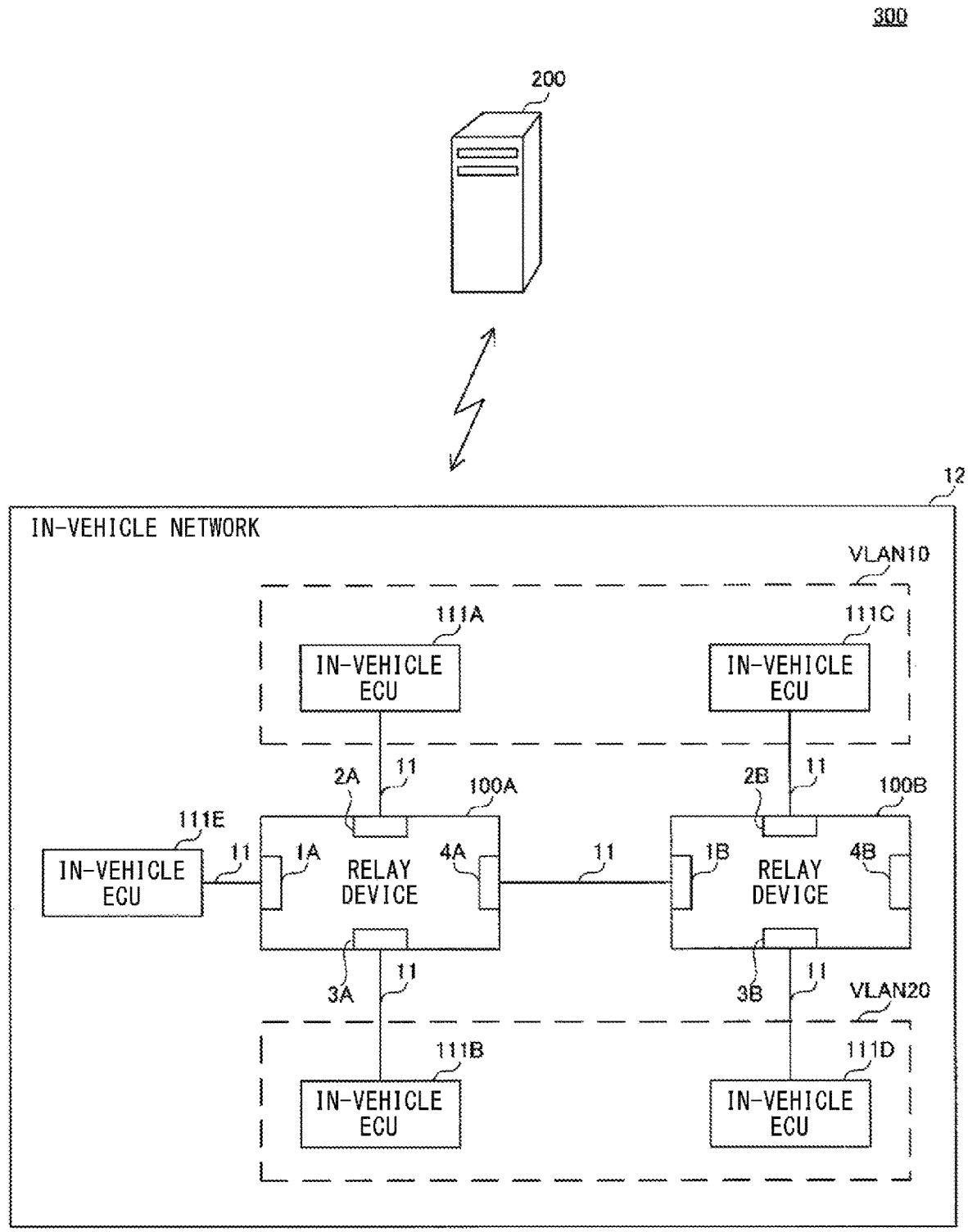
FIG. 4 shows a configuration of the communication system according to the embodiment of the present disclosure.

FIG. 4 shows a configuration of the communication system according to the embodiment of the present disclosure. FIG. 4 shows a configuration of the in-vehicle network 12 obtained by newly adding an in-vehicle ECU 111E to the in-vehicle network 12 shown in FIG. 1.

With reference to FIG. 4, the in-vehicle ECU 111E is connected via an Ethernet cable 11 to the communication port 1A in the relay device 100A.

The in-vehicle ECU 111E is an example of a new function unit, which is a function unit newly added to the in-vehicle network 12.

Hereinafter, the in-vehicle network 12 including a new function unit is also referred to as a new network, the in-vehicle network 12 before the new function unit is added thereto is also referred to as an existing network, and each function unit included in the existing network is also referred to as an existing function unit.

The in-vehicle ECU 111E communicates an Ethernet frame with a function unit serving as a communication target. Hereinafter, the function unit serving as a communication target of a new function unit is also referred to as a target function unit.

When the in-vehicle ECU 111E has been connected via an Ethernet cable 11 to the relay device 100A, the in-vehicle ECU 111E transmits, to the relay device 100A, information capable of specifying an in-vehicle ECU 111 serving as the communication target of the in-vehicle ECU 111E.

More specifically, when the in-vehicle ECU 111E has been connected via an Ethernet cable 11 to the communication port 1A in the relay device 100A, the in-vehicle ECU 111E generates connection request information including the ID, e.g., MAC address, of the in-vehicle ECU 111C serving as the communication target of the in-vehicle ECU 111E.

Then, the in-vehicle ECU 111E generates an Ethernet frame that includes the generated connection request information, the ID of the in-vehicle ECU 111E, an authentication password as secret information, and the MAC address of the relay device 100A as the transmission destination MAC address, and transmits the generated Ethernet frame to the relay device 100A.

Upon receiving via the relay processing unit 110 the Ethernet frame from the in-vehicle ECU 111E, the detection unit 120 in the relay device 100A acquires the connection request information, the ID of the in-vehicle ECU 111E, and the authentication password from the received Ethernet frame, thereby detecting the addition of the in-vehicle ECU 111E to the in-vehicle network 12.

The detection unit 120 outputs the connection request information, the ID of the in-vehicle ECU 111E, and the authentication password that have been acquired, to the authentication result acquisition unit 130.

[Authentication Result Acquisition Unit]

The authentication result acquisition unit 130 is an example of an acquisition unit that acquires the authentication result regarding the in-vehicle ECU 111E serving as a new function unit that has been newly added to the in-vehicle network 12.

For example, upon receiving the connection request information, the ID of the in-vehicle ECU 111E, and the authentication password from the detection unit 120, the authentication result acquisition unit 130 outputs the connection request information, the ID of the new function unit, and the authentication password that have been received, to the authentication unit 140.

Upon receiving the connection request information, the ID of the in-vehicle ECU 111E, and the authentication password from the authentication result acquisition unit 130, the authentication unit 140 performs an authentication process regarding the in-vehicle ECU 111E, by using the connection request information, the ID of the in-vehicle ECU 111E, and the authentication password that have been received.

As a result of the authentication process, when the authentication unit 140 has determined that the in-vehicle ECU 111E is not an authentic communication counterpart with the target function unit, the authentication unit 140 outputs, to the authentication result acquisition unit 130, authentication information indicating a negative authentication result as the authentication result regarding the in-vehicle ECU 111E.

Upon receiving the authentication information indicating the negative authentication result from the authentication unit 140, the authentication result acquisition unit 130 generates an Ethernet frame that includes connection non-permitting information indicating that the connection is not permitted, and the MAC address of the in-vehicle ECU 111E as the transmission destination MAC address, and transmits the generated Ethernet frame to the in-vehicle ECU 111E via the relay processing unit 110.

Meanwhile, as a result of the authentication process, when the authentication unit 140 has confirmed that the in-vehicle ECU 111E is an authentic communication counterpart with the target function unit indicated by the connection request information, the authentication unit 140 outputs, to the authentication result acquisition unit 130, authentication information indicating an affirmative authentication result as the authentication result regarding the in-vehicle ECU 111E.

Upon receiving the authentication information indicating the affirmative authentication result from the authentication unit 140, the authentication result acquisition unit 130 outputs, to the setting unit 150, the connection request information and the ID of the in-vehicle ECU 111E that have been received from the detection unit 120.

[Setting Unit]

When the authentication result acquired by the authentication result acquisition unit 130 is affirmative, the setting unit 150 can perform a setting process for allowing an existing function unit and the in-vehicle ECU 111E to perform communication via the relay devices 100A, 100B, the setting process being regarding at least one of the function units and the relay devices 100A, 100B.

Specifically, when the authentication result acquired by the authentication result acquisition unit 130 is affirmative, the setting unit 150 performs the setting process for allowing the existing function unit and the in-vehicle ECU 111E to perform communication via the relay device 100A and the relay device 100B, the setting process being regarding each function unit.

More specifically, upon receiving the connection request information and the ID of the in-vehicle ECU 111E from the authentication result acquisition unit 130, the setting unit 150 generates, on the basis of the connection request information and the ID of the in-vehicle ECU 111E that have been received, setting information of a new network for allowing the target function unit indicated by the connection request information and the in-vehicle ECU 111E to perform communication via the relay device 100A, 100B.

For example, the storage unit 160 stores therein setting information of the in-vehicle network 12 whose connection relationship between function units is fixed as described above.

More specifically, the storage unit 160 stores setting information for allowing each existing function unit to perform communication in the existing network. Specifically, the storage unit 160 stores the setting information shown in FIG. 2 as the setting information of the existing network.

The setting unit 150 performs the setting process on the basis of the setting information in the storage unit 160.

More specifically, the setting unit 150 generates setting information of a new network on the basis of the setting information of the existing network in the storage unit 160 and the connection request information received from the authentication result acquisition unit 130.

The setting unit 150 updates the existing setting information in the storage unit 160 to the generated new setting information.

Then, on the basis of the setting information after the update in the storage unit 160, the setting unit 150 specifies a function unit for which setting change in the new network is necessary, and the setting unit 150 notifies the specified function unit and the in-vehicle ECU 111E of the setting content.

Setting Process Example 1

For example, as the setting process, the setting unit 150 performs a process of constructing a new virtual network for allowing the in-vehicle ECU 111E and one or a plurality of target function units to perform communication.

In the following, a case where the in-vehicle ECU 111E serving as a new function unit is added to the in-vehicle network 12 as shown in FIG. 4 and the target function unit indicated by the connection request information transmitted from the in-vehicle ECU 111E is the in-vehicle ECU 111C, is assumed.

When the setting unit 150 has received, from the authentication result acquisition unit 130, connection request information indicating that the target function unit is the in-vehicle ECU 111C, the setting unit 150 generates setting information of a new network including a new virtual network for allowing only the in-vehicle ECU 111E and the in-vehicle ECU 111C to perform communication.

Specifically, the setting unit 150 generates setting information of a new network including a new VLAN 30 for allowing only the in-vehicle ECU 111E and the in-vehicle ECU 111C to perform communication.

Figure 5:
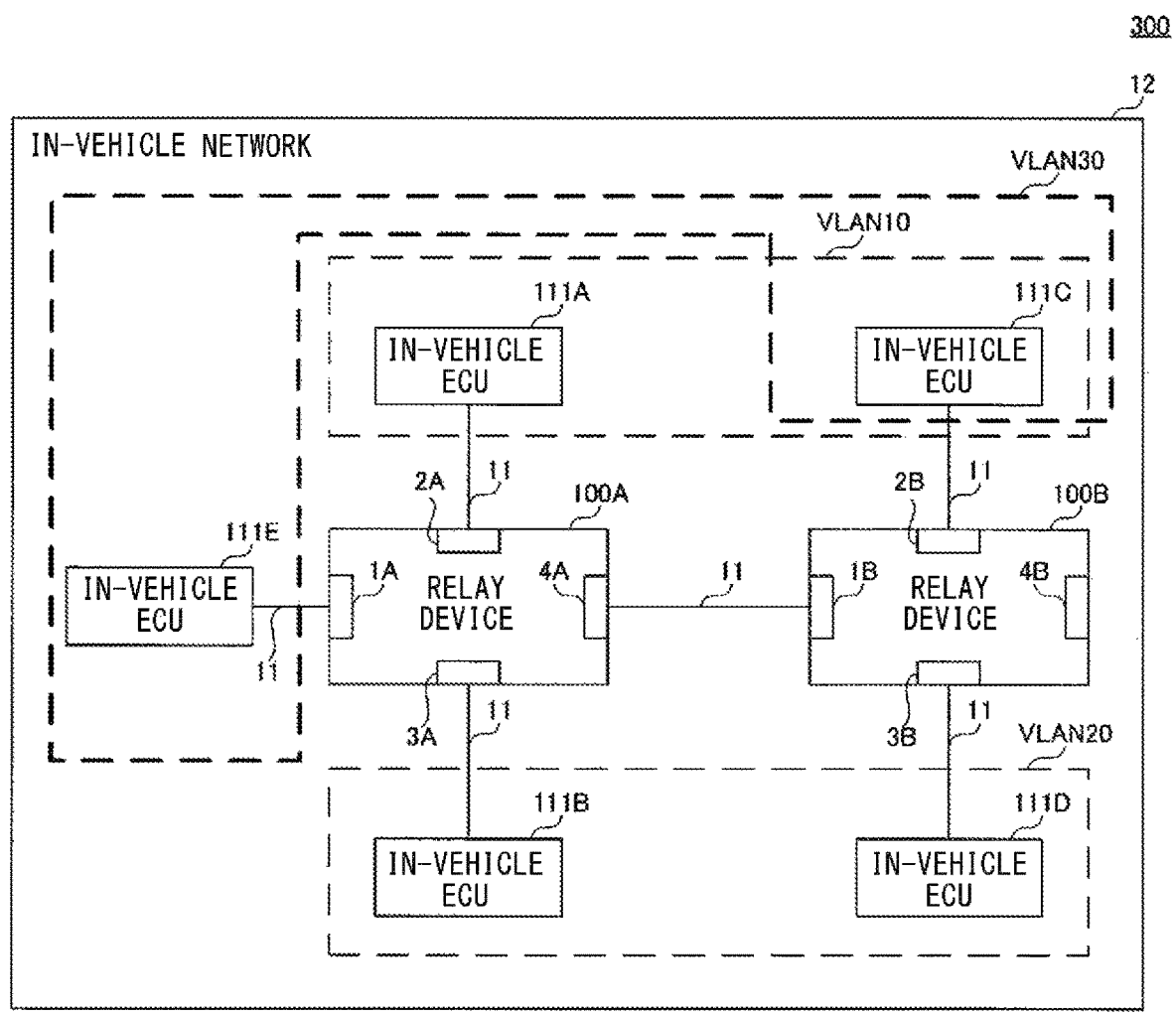
FIG. 5 shows an example of a configuration of a new network in the communication system according to the embodiment of the present disclosure.

FIG. 5 shows an example of a configuration of a new network in the communication system according to the embodiment of the present disclosure.

FIG. 6 shows an example of setting information of the new network according to the embodiment of the present disclosure.

With reference to in FIG. 6, as the setting information of the new network, the setting unit 150 generates new setting information in which: in the setting information of the existing network shown in FIG. 2, "VLAN 30" is added as the ID of the VLAN that corresponds to the communication ports 1A, 4A of the relay device 100A; "VLAN 30" is added as the ID of the VLAN that corresponds to the communication ports 1B, 2B of the relay device 100B; and "VLAN 30" is added as the ID of the VLAN that corresponds to the communication port 1 of each of the in-vehicle ECUs 111C, 111E.

The setting unit 150 updates the existing setting information in the storage unit 160 to the generated new setting information.

On the basis of the setting information after the update in the storage unit 160, the setting unit 150 notifies the relay device 100B, the in-vehicle ECU 111C, and the in-vehicle ECU 111E, which are the function units for which setting change in the new network is necessary, of the setting content.

For example, it is assumed that, in the in-vehicle network 12, a virtual network, e.g., VLAN 50, in which setting information for allowing each function unit to perform communication is communicated between the function units, has been constructed. The setting unit 150 performs the setting process by using the VLAN 50.

More specifically, the setting unit 150 generates an Ethernet frame including setting information of the new network, and transmits the generated Ethernet frame to the relay device 100B and the in-vehicle ECUs 111C, 111E via the relay processing unit 110 by using the VLAN 50.

For example, the relay devices 100A, 100B transmit the Ethernet frame including the setting information, by using an encryption scheme based on secret information shared in advance.

The in-vehicle ECU 111E, the in-vehicle ECU 111C, and the relay device 100B perform setting change in accordance with the setting information included in the Ethernet frame received via the relay processing unit 110 from the setting unit 150.

Specifically, the in-vehicle ECU 111E adds "VLAN 30" as the VLAN that corresponds to communication port 1 of the in-vehicle ECU 111E, in accordance with the setting information included in the received Ethernet frame.

The in-vehicle ECU 111C adds "VLAN 30" as the VLAN that corresponds to the communication port 1 of the in-vehicle ECU 111C, in accordance with the setting information included in the received Ethernet frame.

The setting unit 150 adds "VLAN 30" as the VLAN that corresponds to the communication ports 1A, 4A of the relay device 100A.

The relay device 100B adds "VLAN 30" as the VLAN that corresponds to the communication ports 1B, 2B, in accordance with the setting information included in the received Ethernet frame.

In this manner, in the communication system 300, when a new VLAN 30 for allowing the in-vehicle ECU 111E and the in-vehicle ECU 111C to perform communication is to be constructed, the authentication process regarding the in-vehicle ECU 111E by the relay device 100B is not necessary. That is, without performing the authentication process regarding the in-vehicle ECU 111E, the relay device 100B can perform setting change in accordance with the setting information received from the setting unit 150.

[Setting Process Example 2]

For example, when an existing virtual network as a virtual network for allowing one or a plurality of target function units only, to perform communication has been constructed, the setting unit 150 performs, as the setting process, a setting process regarding the in-vehicle ECU 111E and the relay device 100A and for allowing the in-vehicle ECU 111E and the target function units to perform communication by using the existing virtual network.

In the following, a case where the in-vehicle ECU 111E serving as a new function unit is added to the in-vehicle network 12 as shown in FIG. 4 and the target function unit indicated by the connection request information transmitted from the in-vehicle ECU 111E is the in-vehicle ECU 111A and the in-vehicle ECU 111C, is assumed.

When the setting unit 150 has received from the authentication result acquisition unit 130, connection request information indicating that the target function unit is the in-vehicle ECUs 111A, 111C, the setting unit 150 generates setting information of a new network including a virtual network for allowing the in-vehicle ECU 111E and the in-vehicle ECUs 111A, 111C to perform communication.

Specifically, when the setting unit 150 has confirmed, with reference to the setting information in the storage unit 160, that the VLAN 10 for allowing only the in-vehicle ECU 111A and the in-vehicle ECU 111C to perform communication is included in the existing network, the setting unit 150 generates setting information of a new network for allowing the in-vehicle ECU 111E and the in-vehicle ECUs 111A, 111C to perform communication by using the VLAN 10.

Figure 7:
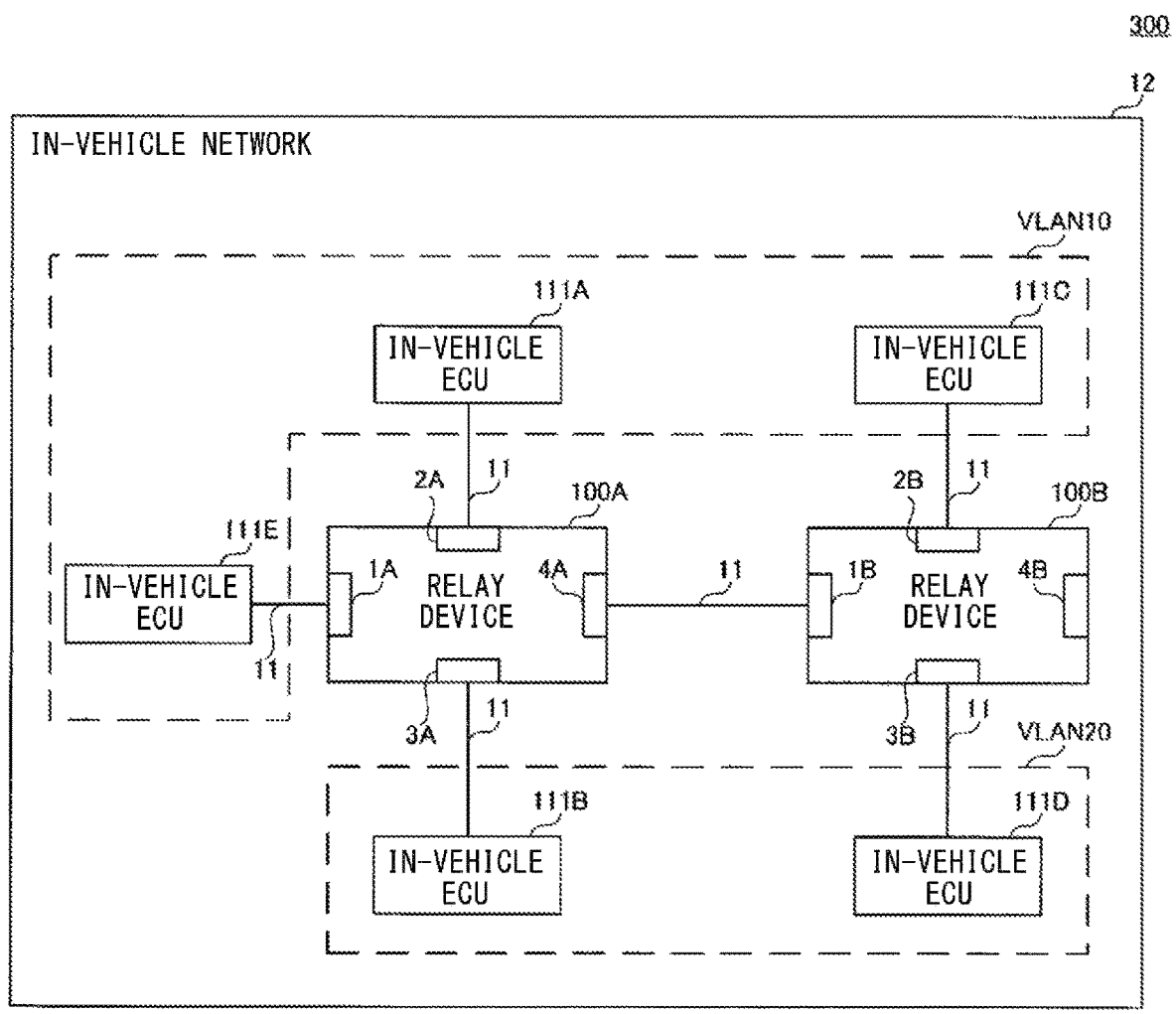
FIG. 7 shows another example of a configuration of a new network in the communication system according to the embodiment of the present disclosure.

FIG. 7 shows another example of a configuration of a new network in the communication system according to the embodiment of the present disclosure.

FIG. 8 shows another example of setting information of the new network according to the embodiment of the present disclosure.

With reference to FIG. 8, as the setting information of the new network, the setting unit 150 generates new setting information in which: in the setting information of the existing network shown in FIG. 2, "VLAN 10" is added as the ID of the VLAN that corresponds to the communication port 1A of the relay device 100A; and "VLAN 10" is added as the ID of the VLAN that corresponds to the communication port 1 of the in-vehicle ECU 111E serving as the new function unit.

The setting unit 150 updates the existing setting information in the storage unit 160 to the generated new setting information.

On the basis of the setting information after the update in the storage unit 160, the setting unit 150 notifies the in-vehicle ECU 111E, which is the function unit for which setting change in the new network is necessary, of the setting content.

More specifically, the setting unit 150 generates an Ethernet frame including the setting information, and transmits the generated Ethernet frame to the in-vehicle ECU 111E via the relay processing unit 110 by using the VLAN 50 described above.

The in-vehicle ECU 111E performs setting change in accordance with the setting information included in the Ethernet frame received via the relay processing unit 110 from the setting unit 150.

Specifically, the in-vehicle ECU 111E adds "VLAN 10" as the VLAN that corresponds to the communication port 1 of the in-vehicle ECU 111E, in accordance with the setting information included in the received Ethernet frame.

The setting unit 150 adds "VLAN 10" as the VLAN that corresponds to the communication port 1A of the relay device 100A.

As described above, in the communication system 300, when a new VLAN 10 for allowing the in-vehicle ECU 111E and the in-vehicle ECUs 111A, 111C to perform communication is to be constructed, the authentication process regarding the in-vehicle ECU 111E by the relay device 100B is not necessary.

[Operation Flow]

Each device in the communication system according to the embodiment of the present disclosure includes a computer that includes a memory. An arithmetic processing unit such as a CPU in the computer reads out, from the memory, a program including a part or all of steps in the flow chart and sequence shown below, and executes the program. Programs of the plurality of devices can each be installed from outside. The programs of the plurality of devices are each distributed in a state of being stored in a storage medium.

Figure 9:
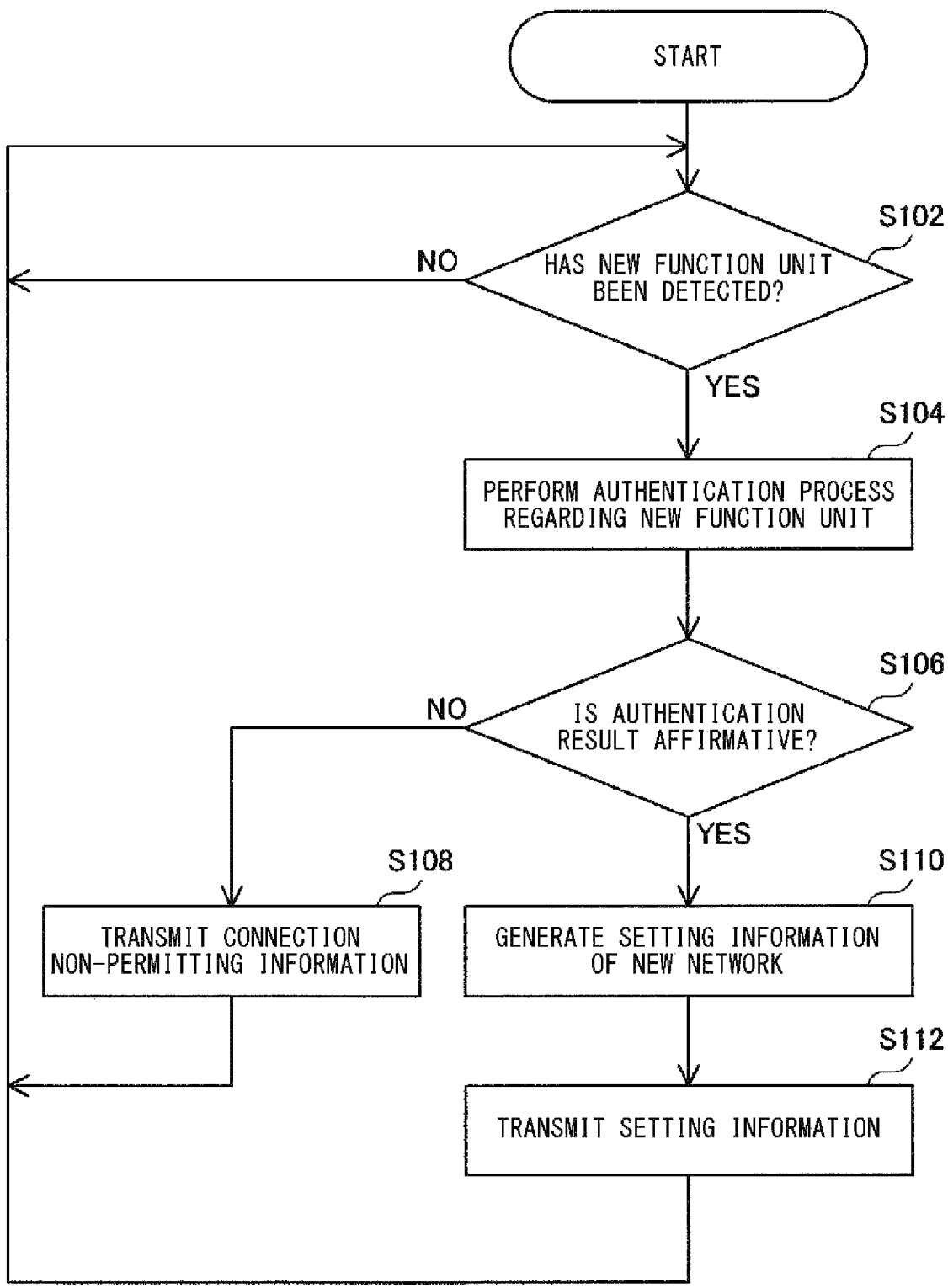
FIG. 9 is a flow chart describing an operation procedure according to which the relay device constructs a new network in the communication system according to the embodiment of the present disclosure.

FIG. 9 is a flow chart describing an operation procedure according to which the relay device constructs a new network in the communication system according to the embodiment of the present disclosure.

With reference to FIG. 9, first, the relay device 100A waits for addition of a new function unit to the in-vehicle network 12 (NO in step S102), and upon detection of addition of a new function unit to the in-vehicle network 12 (YES in step S102), the relay device 100A performs an authentication process regarding the detected new function unit (step S104).

Next, when the authentication result is negative (NO in step S106), the relay device 100A transmits, to the new function unit, connection non-permitting information indicating that the connection is not permitted (step S108).

Next, the relay device 100A waits for new addition of a new function unit to the in-vehicle network 12 (NO in step S102).

Meanwhile, when the authentication result is affirmative (YES in step S106), the relay device 100A generates setting information of a new network for allowing the relay device 100B and the target function unit, and the new function unit to perform communication (step S110).

Next, on the basis of the generated setting information, the relay device 100A specifies a function unit for which setting change in the new network is necessary, and transmits the setting information to the specified function unit and the in-vehicle ECU 111E (step S112).

Next, the relay device 100A waits for new addition of a new function unit to the in-vehicle network 12 (NO in step S102).

Figure 10:
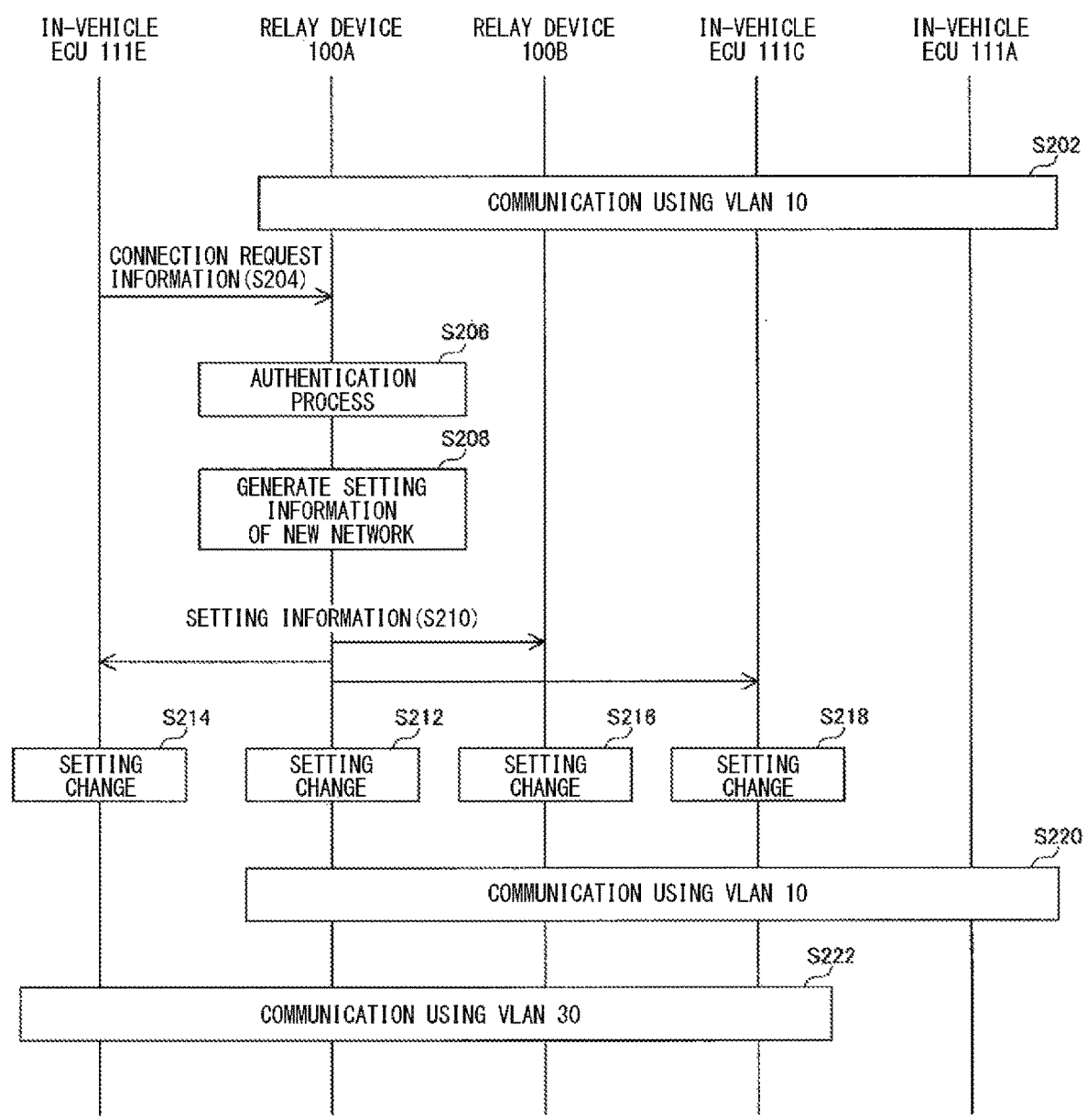
FIG. 10 shows an example of the sequence of a construction process of a new network in the communication system according to the embodiment of the present disclosure.

FIG. 10 shows an example of the sequence of a construction process of a new network in the communication system according to the embodiment of the present disclosure. FIG. 10 shows an example of the sequence of a construction process of the new network as shown in FIG. 5.

With reference to FIG. 10, first, in the existing in-vehicle network 12, the in-vehicle ECU 111A and the in-vehicle ECU 111C belong to the same VLAN 10, and are performing communication with each other via the relay devices 100A, 100B by using the VLAN 10 (step S202).

Next, when the in-vehicle ECU 111E serving as the new function unit newly added to the in-vehicle network 12 has been connected to the relay device 100A, the in-vehicle ECU 111E transmits, to the relay device 100A, connection request information including information capable of specifying the in-vehicle ECU 111C serving as the communication target of the in-vehicle ECU 111E (step S204).

Next, upon receiving the connection request information from the in-vehicle ECU 111E, the relay device 100A detects the in-vehicle ECU 111E, and performs an authentication process regarding the in-vehicle ECU 111E (step S206).

Next, when the authentication result is affirmative, the relay device 100A generates setting information of a new network for allowing the relay device 100B and the in-vehicle ECU 111C, and the in-vehicle ECU 111E to perform communication by using the VLAN 30. Specifically, the setting information as shown in FIG. 6 is generated (step S208).

Next, the relay device 100A transmits the generated setting information to the relay device 100B, the in-vehicle ECU 111C, and the in-vehicle ECU 111E, which are the function units for which setting change in the new network is necessary (step S210).

Next, the relay device 100A performs setting change on the basis of the generated setting information (step S212).

The in-vehicle ECU 111E performs setting change in accordance with the setting information received from the relay device 100A (step S214).

The relay device 100B performs setting change in accordance with the setting information received from the relay device 100A (step S216).

The in-vehicle ECU 111C performs setting change in accordance with the setting information received from the relay device 100A (step S218).

Next, in the new network 12, the in-vehicle ECU 111A and the in-vehicle ECU 111C perform communication with each other via the relay devices 100A, 100B by using the VLAN 10 (step S220).

In the new network 12, the in-vehicle ECU 111E and the in-vehicle ECU 111C perform communication with each other via the relay devices 100A, 100B by using the newly generated VLAN 30 (step S222).

Figure 11:
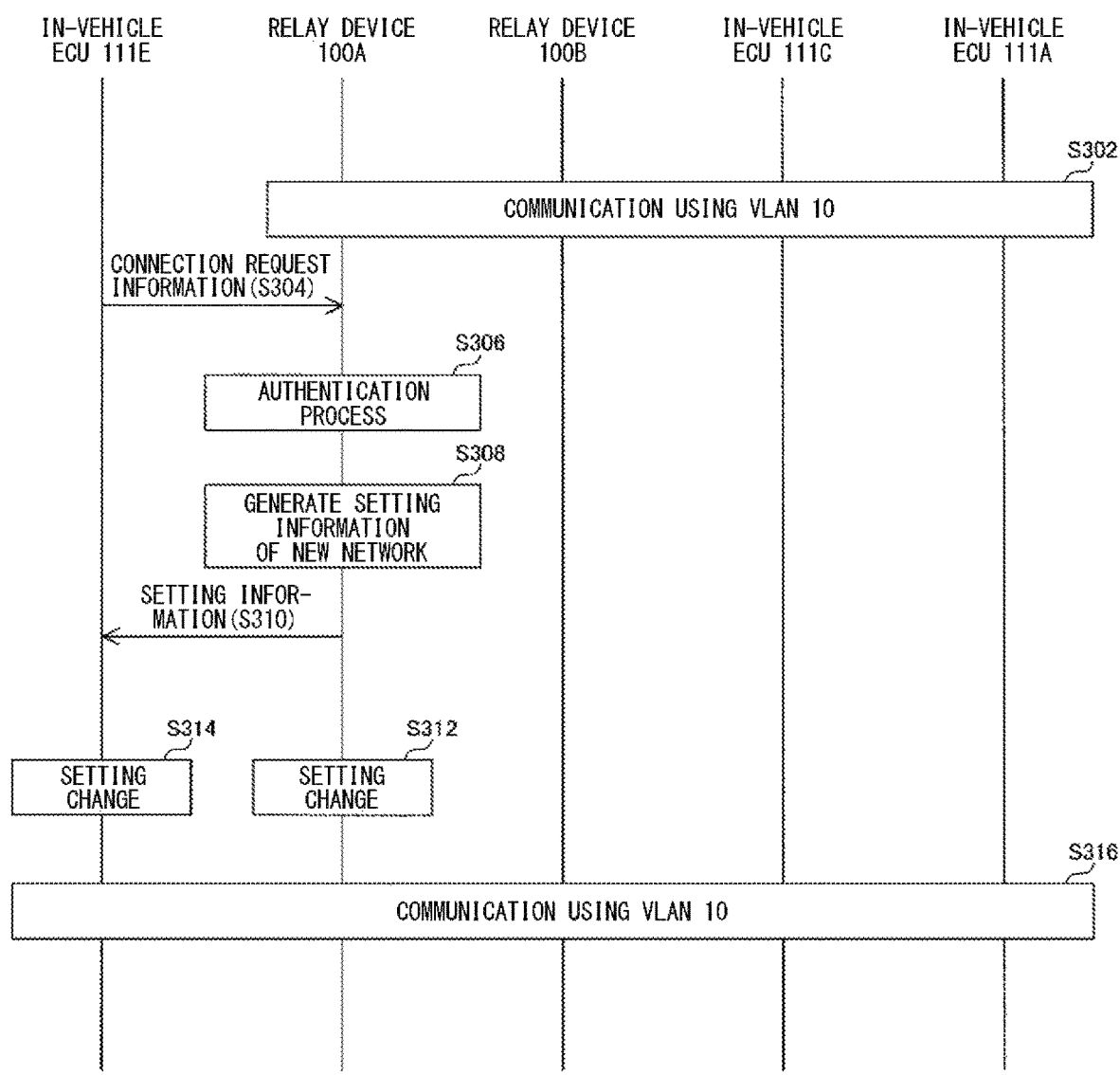
FIG. 11 shows another example of the sequence of a construction process of a new network in the communication system according to the embodiment of the present disclosure.

FIG. 11 shows another example of the sequence of a construction process of a new network in the communication system according to the embodiment of the present disclosure. FIG. 11 shows an example of the sequence of a construction process of the new network as shown in FIG. 7.

With reference to FIG. 11, first, in the existing in-vehicle network 12, the in-vehicle ECU 111A and the in-vehicle ECU 111C belong to the same VLAN 10, and are performing communication with each other via the relay devices 100A, 100B by using the VLAN 10 (step S302).

Next, when the in-vehicle ECU 111E serving as the new function unit newly added to the in-vehicle network 12 has been connected to the relay device 100A, the in-vehicle ECU 111E transmits, to the relay device 100A, connection request information including information capable of specifying the in-vehicle ECUs 111A, 111C serving as the communication target of the in-vehicle ECU 111E (step S304).

Next, upon receiving the connection request information from the in-vehicle ECU 111E, the relay device 100A detects the in-vehicle ECU 111E and performs an authentication process regarding the in-vehicle ECU 111E (step S306).

Next, when the authentication result is affirmative, the relay device 100A generates setting information of a new network for allowing the relay device 100B and the in-vehicle ECUs 111A, 111C, and the in-vehicle ECU 111E to perform communication by using the VLAN 10. Specifically, the setting information as shown in FIG. 8 is generated (step S308).

Next, the relay device 100A transmits the generated setting information to the in-vehicle ECU 111E, which is the function unit for which setting change in the new network is necessary (step S310).

Next, the relay device 100A performs setting change on the basis of the generated setting information (step S312).

The in-vehicle ECU 111E performs setting change in accordance with the setting information received from the relay device 100A (step S314).

Next, in the new network 12, the in-vehicle ECU 111A, the in-vehicle ECU 111C, and the in-vehicle ECU 111E perform communication with each other via the relay devices 100A, 100B by using the VLAN 10 (step S316).

In the communication system 300 according to the embodiment of the present disclosure, out of the two relay devices 100, the relay device 100A, to which the in-vehicle ECU 111E serving as the new function unit is connected, performs, as the setting device, the acquisition of the authentication result regarding the in-vehicle ECU 111E and the setting process. However, the present disclosure is not limited thereto. Out of the two relay devices 100, the relay device 100B, which is the relay device 100 to which the in-vehicle ECU 111E is not connected, may perform the acquisition of the authentication result and the setting process.

A device other than the relay device 100 in the in-vehicle network 12 may perform, as the setting device, the acquisition of the authentication result and the setting process. For example, a device not positioned on the communication path between a new function unit and a target function unit in the in-vehicle network 12 may perform, as the setting device, the acquisition of the authentication result and the setting process.

A device outside the vehicle, e.g., the server 200, may perform, as the setting device, the acquisition of the authentication result and the setting process. In this case, the server 200 performs communication with a TCU in the in-vehicle network 12, thereby performing acquisition of connection request information transmitted from the in-vehicle ECU 111E, which is information capable of specifying the target function unit, the acquisition of the authentication result, the setting process, and the like.

In the communication system 300 according to the embodiment of the present disclosure, the in-vehicle ECU 111E serving as the new function unit transmits, to the relay device 100A, connection request information including the MAC address of the in-vehicle ECU 111C, as the information capable of specifying the in-vehicle ECU 111C serving as the target function unit. However, the present disclosure is not limited thereto. As the information capable of specifying the in-vehicle ECU 111C, the in-vehicle ECU 111E may transmit, to the relay device 100A, another type of information such as the IP address of the in-vehicle ECU 111C.

In the relay device 100A according to the embodiment of the present disclosure, the authentication result acquisition unit 130 acquires the authentication result regarding the in-vehicle ECU 111E from the authentication unit 140 in the relay device 100A. However, the present disclosure is not limited thereto. The authentication result acquisition unit 130 may acquire the authentication result regarding the in-vehicle ECU 111E from a device other than the relay device 100A.

In the relay device 100A according to the embodiment of the present disclosure, the detection unit 120 detects an in-vehicle ECU 111 serving as a new function unit that is newly added to the in-vehicle network 12. However, the present disclosure is not limited thereto. The detection unit 120 may detect, as a new function unit, an application installed in an existing in-vehicle ECU 111 in the in-vehicle network 12. That is, the new function unit may be hardware or may be software.

In the relay device 100A according to the embodiment of the present disclosure, the setting unit 150 generates setting information of a new network on the basis of the setting information of the existing network in the storage unit 160. However, the present disclosure is not limited thereto. The setting unit 150 may transmit to, each function unit in the in-vehicle network 12, an information request notification for requesting transmission of information indicating the setting content of the function unit, and on the basis of the setting content received from each function unit as a response to the information request notification, the setting unit 150 may generate setting information of the new network.

In the relay device 100A according to the embodiment of the present disclosure, the setting unit 150 transmits, to each function unit in the in-vehicle network 12, setting information by using the VLAN 50 for allowing the setting information to be communicated between the function units. However, the present disclosure is not limited thereto. The setting unit 150 may transmit the setting information to a transmission destination function unit by using a VLAN for allowing communication to be performed between some function units in the in-vehicle network 12.

Further, for example, the relay devices 100A, 100B may communicate setting information and the like by using a network setting API (Application Programming Interface) used in a consumer product.

In the relay device 100A according to the embodiment of the present disclosure, the setting unit 150 specifies a function unit for which setting change in the new network is necessary, and transmits the setting information after update to the specified function unit and the in-vehicle ECU 111E. However, the present disclosure is not limited thereto. The setting unit 150 may generate, for each of the specified function unit and the in-vehicle ECU 111E, setting change information indicating the content of setting change for each function unit, and transmit, to the specified function unit and the in-vehicle ECU 111E, the corresponding setting change information.

[Problem]

For example, if a high-performance sensor that transmits a measurement result to an automated driving ECU, which is an example of the in-vehicle ECU 111, is added to the existing in-vehicle network 12 including the automated driving ECU, the control function of the automated driving ECU in automated driving can be improved.

Thus, there is a demand for a technology that customizes the in-vehicle network 12 by newly adding an in-vehicle ECU 111 to the existing in-vehicle network 12.

However, in a state where an in-vehicle ECU 111 is newly added to the in-vehicle network 12, that the in-vehicle ECU 111 and the target function unit perform communication by using an existing virtual network in the new in-vehicle network 12 is not preferable in terms of security of the in-vehicle network 12 in some cases.

Specific description is given below. In the following, a case where the in-vehicle ECU 111E serving as a new function unit is added to the in-vehicle network 12 as shown in FIG. 4 and the target function unit indicated by connection request information transmitted from the in-vehicle ECU 111E is the in-vehicle ECU 111C, is assumed.

For example, when the relay device 100A has received the connection request information from the in-vehicle ECU 111E and has constructed a new network as shown in FIG. 7, the in-vehicle ECU 111E becomes able to perform communication not only with the in-vehicle ECU 111C serving as the target function unit but also with the in-vehicle ECU 111A with which, originally, the in-vehicle ECU 111E need not perform communication.

For example, when the in-vehicle ECU 111E is an unauthorized ECU, there is a risk that not only the in-vehicle ECU 111C but also the in-vehicle ECU 111A is subjected to an unauthorized access.

Therefore, in order to avoid a situation where the in-vehicle ECU 111A is subjected to an unauthorized access, construction of a new network, e.g., a new network as shown in FIG. 5, in which only communication with the in-vehicle ECU 111C serving as the target function unit is permitted to the in-vehicle ECU 111E, is conceivable.

However, when the new network as shown in FIG. 5 is constructed, the authentication process regarding the in-vehicle ECU 111E and change of the network configuration need to be performed in each relay device 100, i.e., the relay devices 100A, 100B, present on the communication path between the in-vehicle ECU 111E and the in-vehicle ECU 111C.

Therefore, it takes time from when the in-vehicle ECU 111E is added to the in-vehicle network 12 until when communication between the in-vehicle ECU 111E and the in-vehicle ECU 111C is enabled.

Further, all of the relay devices 100 that are present on the communication path between the in-vehicle ECU 111E and the in-vehicle ECU 111C need to be provided with an authentication function for authenticating the in-vehicle ECU 111E to be newly added. This increases the cost required in development of hardware and software.

In contrast to this, in the relay device 100A according to the embodiment of the present disclosure, the authentication result acquisition unit 130 acquires an authentication result regarding a new function unit serving as a function unit newly added to the in-vehicle network 12 including one or a plurality of function units. When the authentication result acquired by the authentication result acquisition unit 130 is affirmative, the setting unit 150 can perform a setting process for allowing the new function unit and an existing function unit serving as a function unit included in the in-vehicle network 12 before the new function unit is added thereto, to perform communication via a plurality of relay devices 100A, 100B capable of relaying information between the function units, the setting process being regarding at least one of the relay devices, the existing function unit, and the new function unit.

As described above, when the authentication result regarding the new function unit is affirmative, the relay device 100A performs the setting process for allowing the existing function unit and the new function unit to perform communication via the plurality of relay devices 100A, 100B, the setting process being regarding at least one of the relay devices 100A, 100B, the existing function unit, and the new function unit. Due to this configuration, for example, when a network for allowing the existing function unit and the new function unit to perform communication via the plurality of relay devices 100A, 100B is to be constructed, the authentication process and the like regarding the new function unit by the relay device 100B, which is a part of devices in the in-vehicle network 12, can be omitted.

Therefore, in the relay device 100A according to the embodiment of the present disclosure, a network having a new configuration can be flexibly constructed through a simple process while ensuring security in the network.

In the relay device 100A according to the embodiment of the present disclosure, the storage unit 160 stores setting information for allowing each function unit in the in-vehicle network 12 to perform communication. The setting unit 150 performs the setting process on the basis of the setting information in the storage unit 160.

Due to this configuration, when a new in-vehicle network 12 including a new function unit is to be constructed while the storage unit 160 retains the setting information of the in-vehicle network 12 whose network configuration is basically fixed, setting information of the new in-vehicle network 12 is generated by using the setting information of the existing in-vehicle network 12 acquired from the storage unit 160. Therefore, the construction process of the new in-vehicle network 12 can be simplified.

In the relay device 100A according to the embodiment of the present disclosure, the setting unit 150 performs the setting process by using a virtual network for transmitting, to each function unit in the in-vehicle network 12, setting information for allowing the function unit to perform communication.

Due to this configuration, the setting information can be transmitted to each function unit in the in-vehicle network 12 from the relay device 100A by using the virtual network. Therefore, the setting process regarding each function unit can be simplified.

In the relay device 100A according to the embodiment of the present disclosure, the setting unit 150 performs, as the setting process, a process of constructing a new virtual network for allowing a new function unit and one or a plurality of the existing function units serving as the communication target of the new function unit to perform communication.

Due to this configuration, it is possible to suppress adverse influence, such as an unauthorized access, that is associated with addition of a new function unit to the in-vehicle network 12, on an existing function unit that is not the communication target of the new function unit.

In the relay device 100A according to the embodiment of the present disclosure, when an existing virtual network as a virtual network for allowing one or a plurality of existing function units serving as the communication target of the new function unit only, to perform communication has been constructed, the setting unit 150 performs, as the setting process, a setting process regarding the new function unit and the relay device 100A and for allowing the new function unit and the one or the plurality of existing function units serving as the communication target to perform communication by using the existing virtual network.

Due to this configuration, since the setting process regarding the addition of the new function unit to the existing virtual network is performed, the construction process of a new network for allowing only the new function unit and the existing function unit serving as the communication target to perform communication is not necessary.

The communication system 300 according to the embodiment of the present disclosure includes the relay device 100A, and a new function unit serving as a function unit newly added to the in-vehicle network 12 including one or a plurality of function units. The relay device 100A acquires information transmitted from the new function unit and capable of specifying a function unit serving as the communication target of the new function unit. The relay device 100A acquires an authentication result regarding the new function unit. When the acquired authentication result is affirmative, the relay device 100A transmits, to the new function unit, setting information for allowing the function unit serving as the communication target and the new function unit to perform communication via a plurality of relay devices 100A, 100B capable of relaying information between the function units. The new function unit performs setting for the new function unit on the basis of the setting information received from the relay device 100A.

As described above, when the authentication result regarding the new function unit is affirmative, the relay device 100A transmits, to the new function unit, setting information for allowing the existing function unit serving as the communication target and the new function unit to perform communication via the plurality of relay devices 100A, 100B. Due to this configuration, for example, when a network for allowing the existing function unit and the new function unit to perform communication via the plurality of relay devices 100A, 100B is to be constructed, the authentication process and the like regarding the new function unit by the relay device 100B, which is a part of devices in the in-vehicle network 12, can be omitted.

Therefore, in the communication system 300 according to the embodiment of the present disclosure, a network having a new configuration can be flexibly constructed through a simple process while ensuring security in the network.

A vehicle communication management method according to the embodiment of the present disclosure is a vehicle communication management method to be performed in the relay device 100A. In this vehicle communication management method, first, the relay device 100A acquires an authentication result regarding a new function unit serving as a function unit newly added to the in-vehicle network 12 including one or a plurality of function units. Next, when the acquired authentication result is affirmative, the relay device 100A performs a setting process for allowing the new function unit and an existing function unit serving as a function unit included in the in-vehicle network 12 before the new function unit is added thereto, to perform communication via a plurality of relay devices 100A, 100B capable of relaying information between the function units, the setting process being regarding at least one of the relay devices 100A, 100B, the existing function unit, and the new function unit.

As described above, when the authentication result regarding the new function unit is affirmative, the relay device 100A performs the setting process for allowing the existing function unit and the new function unit to perform communication via the plurality of the relay devices 100A, 100B, the setting process being regarding at least one of the relay devices 100A, 100B, the existing function unit, and the new function unit. Due to this method, for example, when a network for allowing the existing function unit and the new function unit to perform communication via the plurality of relay devices 100A, 100B is to be constructed, the authentication process and the like regarding the new function unit by the relay device 100B, which is a part of devices in the in-vehicle network 12, can be omitted.

Therefore, in the vehicle communication management method according to the embodiment of the present disclosure, a network having a new configuration can be flexibly constructed through a simple process while ensuring security in the network.

A vehicle communication management method according to the embodiment of the present disclosure is a vehicle communication management method to be performed in the communication system 300 including the relay device 100A and a new function unit serving as a function unit newly added to the in-vehicle network 12 including one or a plurality of function units. In this vehicle communication management method, first, the relay device 100A acquires information transmitted from the new function unit and capable of specifying a function unit serving as a communication target of the new function unit. Next, the relay device 100A acquires an authentication result regarding the new function unit. Next, when the acquired authentication result is affirmative, the relay device 100A transmits, to the new function unit, setting information for allowing the function unit serving as the communication target and the new function unit to perform communication via a plurality of relay devices 100A, 100B capable of relaying information between the function units. Next, the new function unit performs setting for the new function unit on the basis of the setting information received from the relay device 100A.

As described above, when the authentication result regarding the new function unit is affirmative, the relay device 100A transmits, to the new function unit, setting information for allowing the existing function unit serving as the communication target and the new function unit to perform communication via the plurality of relay devices 100A, 100B. Due to this method, for example, when a network for allowing the existing function unit and the new function unit to perform communication via the plurality of relay devices 100A, 100B is to be constructed, the authentication process and the like regarding the new function unit by the relay device 100B, which is a part of devices of the in-vehicle network 12, can be omitted.

Therefore, in the vehicle communication management method according to the embodiment of the present disclosure, a network having a new configuration can be flexibly constructed through a simple process while ensuring security in the network.

The above embodiment is merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

A relay device capable of relaying information between function units in an in-vehicle network including one or a plurality of function units, the relay device comprising:
   a detection unit configured to detect a new function unit serving as a function unit newly added to the in-vehicle network;
   an acquisition unit configured to acquire an authentication result regarding the new function unit detected by the detection unit; and
   a setting unit configured to, when the authentication result acquired by the acquisition unit is affirmative, perform a setting process for allowing the new function unit and an existing function unit serving as a function unit included in the in-vehicle network before the new function unit is added thereto, to perform communication via a plurality of relay devices capable of relaying information between the function units, the setting process being regarding at least one of the relay devices, the existing function unit, and the new function unit.

[Additional Note 2]

A setting device comprising:
   an acquisition unit configured to acquire an authentication result regarding a new function unit serving as a function unit newly added to an in-vehicle network including one or a plurality of function units; and
   a setting unit configured to, when the authentication result acquired by the acquisition unit is affirmative, perform a setting process for allowing the new function unit and an existing function unit serving as a function unit included in the in-vehicle network before the new function unit is added thereto, to perform communication via a plurality of relay devices capable of relaying information between the function units, the setting process being regarding at least one of the relay devices, the existing function unit, and the new function unit, wherein
   the acquisition unit and the setting unit are each realized by a processor.

[Additional Note 3]

An in-vehicle communication system comprising:
   a first relay device capable of relaying information between function units in an in-vehicle network including a plurality of function units, and a second relay device connected to the first relay device; and
   a new function unit serving as a function unit newly added to the in-vehicle network, wherein
   the new function unit transmits, to the first relay device, information capable of specifying a function unit serving as a communication target of the new function unit, the first relay device detects addition of the new function unit to the in-vehicle network, the first relay device acquires an authentication result regarding the detected new function unit, when the acquired authentication result is affirmative, the first relay device transmits, to the new function unit, setting information for allowing the function unit serving as the communication target and the new function unit to perform communication via the first relay device and the second relay device, and the new function unit performs setting for the new function unit on the basis of the setting information received from the first relay device.

[Additional Note 4]

An in-vehicle communication system comprising:

a setting device; and a new function unit serving as a function unit newly added to an in-vehicle network including one or a plurality of function units, wherein the setting device acquires information transmitted from the new function unit and capable of specifying a function unit serving as a communication target of the new function unit, the setting device acquires an authentication result regarding the new function unit, when the acquired authentication result is affirmative, the setting device transmits, to the new function unit, setting information for allowing the function unit serving as the communication target and the new function unit to perform communication via a plurality of relay devices capable of relaying information between the function units, the new function unit performs setting for the new function unit on the basis of the setting information received from the setting device, and the function unit is an ECU.

REFERENCE SIGNS LIST 1, 2, 3, 4 communication port
11 Ethernet cable
12 in-vehicle network
100 relay device
110 relay processing unit
111 in-vehicle ECU
120 detection unit
130 authentication result acquisition unit
140 authentication unit
150 setting unit
160 storage unit
200 server
300 communication system

The invention claimed is:

1. A setting device comprising:
an acquisition unit configured to acquire an authentication result regarding a new function unit serving as a function unit newly added to an in-vehicle network including one or a plurality of function units; and
a setting unit configured to, when the authentication result acquired by the acquisition unit is affirmative, perform a setting process of a virtual network ID for allowing the new function unit and an existing function unit serving as a function unit included in the in-vehicle network before the new function unit is added thereto, to perform communication via a plurality of relay devices configured to relay information between the function units, the setting process of the virtual network ID being regarding at least one of the relay devices, the existing function unit, and the new function unit, wherein
in the setting process of the virtual network ID, when setting change of a virtual network ID of another relay device is necessary in order for the new function unit and the existing function unit serving as a communication target of the new function unit to communicate with each other via the plurality of relay devices, the setting unit notifies the other relay device of a setting content of the virtual network ID.

2. The setting device according to claim 1, further comprising
a storage unit configured to store setting information of a virtual network ID for allowing each function unit in the in-vehicle network to perform communication, wherein
the setting unit performs the setting process of the virtual network ID on the basis of the setting information of the virtual network ID in the storage unit.

3. The setting device according to claim 1, wherein
the setting unit performs the setting process of the virtual network ID by using a virtual network for transmitting, to each function unit in the in-vehicle network, setting information for allowing each function unit to perform communication.

4. The setting device according to claim 1, wherein
the setting unit performs, as the setting process of the virtual network ID, a process of constructing a new virtual network for allowing the new function unit and one or a plurality of the existing function units serving as a communication target of the new function unit to perform communication.

5. The setting device according to claim 1, wherein
an existing virtual network is a virtual network for allowing one or a plurality of the existing function units alone, to perform communication, and the setting unit performs, as the setting process of the virtual network ID, a setting process of a virtual network ID regarding the new function unit and the relay device and for allowing the new function unit and the one or the plurality of the existing function units to perform communication by using the existing virtual network, the one or the plurality of the existing function units serving as a communication target of the new function unit.

6. The setting device according to claim 1, wherein
the setting device is provided in the relay device serving as a function unit included in the in-vehicle network, and
in the setting process of the virtual network ID, the setting unit:
generates setting information of a virtual network ID of a new network for allowing the new function unit and the existing function unit serving as a communication target of the new function unit to perform communication via the plurality of relay devices; and
specifies, on the basis of the generated setting information of the virtual network ID, a function unit for which setting change of a virtual network ID in the new network is necessary.

7. The setting device according to claim 1, wherein
the setting device is provided in the relay device, and
the setting unit receives, from the new function unit, connection request information indicating a target function unit serving as a communication target of the new function unit, and when setting change of a virtual network ID of another relay device is necessary for allowing the new function unit and the target function unit indicated by the connection request information among the existing function units, to perform communication via the plurality of relay devices, notifies, in the setting process of the virtual network ID, the other relay device of a setting content of the virtual network ID.

8. The setting device according to claim 1, wherein the setting unit transmits, to the relay device, setting information of the virtual network ID for allowing each function unit in the in-vehicle network to perform communication, through encrypted communication using secret information shared in advance with the relay device.

9. A communication system comprising:

a setting device; and a new function unit serving as a function unit newly added to an in-vehicle network including one or a plurality of function units, wherein the setting device acquires information transmitted from the new function unit and capable of specifying a function unit serving as a communication target of the new function unit, the setting device acquires an authentication result regarding the new function unit, when the acquired authentication result is affirmative, the setting device transmits, to the new function unit, setting information of a virtual network ID for allowing the function unit serving as the communication target and the new function unit to perform communication via a plurality of relay devices configured to relay information between the function units, the new function unit performs setting of the virtual network ID for the new function unit on the basis of the setting information of the virtual network ID received from the setting device, and when setting change of a virtual network ID of another relay device is necessary in order for the new function unit and the function unit serving as a communication target of the new function unit to communicate with each other via the plurality of relay devices, the setting device notifies the other relay device of a setting content of the virtual network ID.

10. A vehicle communication management method to be performed in a setting device, the vehicle communication management method comprising the steps of:

acquiring an authentication result regarding a new function unit serving as a function unit newly added to an in-vehicle network including one or a plurality of function units; and performing, when the acquired authentication result is affirmative, a setting process of a virtual network ID for allowing the new function unit and an existing function unit serving as a function unit included in the in-vehicle network before the new function unit is added thereto, to perform communication via a plurality of relay devices configured to relay information between the function units, the setting process of the virtual network ID being regarding at least one of the relay devices, the existing function unit, and the new function unit, wherein the performing includes, when setting change of a virtual network ID of another relay device is necessary in order for the new function unit and the existing function unit serving as a communication target of the new function unit to communicate with each other via the plurality of relay devices, notifying the other relay device of a setting content of the virtual network ID.

11. A vehicle communication management method to be performed in a communication system that includes a setting device and a new function unit serving as a function unit newly added to an in-vehicle network including one or a plurality of function units, the vehicle communication management method comprising the steps of:

acquiring, by the setting device, information transmitted from the new function unit and capable of specifying a function unit serving as a communication target of the new function unit;

acquiring, by the setting device, an authentication result regarding the new function unit;

transmitting to the new function unit, performed by the setting device, when the acquired authentication result is affirmative, setting information of a virtual network ID for allowing the function unit serving as the communication target and the new function unit to perform communication via a plurality of relay devices configured to relay information between the function units;

performing setting of a virtual network ID for the new function unit, performed by the new function unit, on the basis of the setting information of the virtual network ID received from the setting device; and when setting change of a virtual network ID of another relay device is necessary in order for the new function unit and the function unit serving as a communication target of the new function unit to communicate with each other via the plurality of relay devices, notifying the other relay device of a setting content of the virtual network ID.

* * * * *